United States Patent [19]

Patel et al.

[11] Patent Number: 5,294,979
[45] Date of Patent: Mar. 15, 1994

[54] ESTIMATION OF NOISE USING BURST GATE RESPONSE TO VIDEO SIGNAL

[75] Inventors: Chandrakant B. Patel, Hopewell, Pa.; Hermann J. Weckenbrock, Bordentown, N.J.; Werner F. Wedam, Lawrenceville, N.J.; Ted N. Altman, East Windsor, N.J.

[73] Assignee: SamSung Electronics Co., Ltd., Suwon, Rep. of Korea

[21] Appl. No.: 73,478

[22] Filed: Jun. 9, 1993

Related U.S. Application Data

[63] Continuation-in-part of Ser. No. 713,258, Jun. 13, 1991, abandoned.

[51] Int. Cl.$^5$ .............. H04N 17/00; H04N 9/64; H04N 5/213; H04N 5/08
[52] U.S. Cl. .................... 348/624; 348/533
[58] Field of Search .......... 358/36, 37, 166, 167, 358/155, 157, 139; H04N 9/64, 5/14, 5/208, 5/213, 5/08, 17/00

[56] References Cited

U.S. PATENT DOCUMENTS

| | | | |
|---|---|---|---|
| 4,496,978 | 1/1985 | Sakamoto et al. | 358/155 |
| 4,581,641 | 4/1986 | Turner | 358/167 |
| 4,684,989 | 8/1987 | Roeder et al. | 358/167 |
| 4,873,574 | 10/1989 | Darby | 358/139 |
| 4,970,594 | 11/1990 | Kitaura et al. | 358/172 |
| 5,032,915 | 7/1991 | Ichimura | 358/166 |
| 5,113,262 | 5/1992 | Strolle et al. | 358/310 |

*Primary Examiner*—Mark R. Powell
*Assistant Examiner*—John W. Miller
*Attorney, Agent, or Firm*—Robert E. Bushnell

[57] ABSTRACT

Noise estimation circuitry for estimating the noise in a small number of horizontal scanning lines of a video signal includes a lowpass line comb filter responding to said video signal, but not to chrominance-descriptive components thereof. The video signal free from chrominance-descriptive components is repeatedly sampled during the backporch interval of each horizontal scanning line, and the samples are accumulated to generate a revised noise estimate each successive horizontal scanning line.

59 Claims, 7 Drawing Sheets

ESTIMATION OF NOISE USING BURST GATE RESPONSE TO VIDEO SIGNAL

FIELD OF INVENTION

This is a continuation-in-part of U.S. patent application Ser. No. 07/713,258 filed Jun. 13, 1991 and now abandoned.

The current invention relates to signal processing generally, and more particularly to processes and circuits for monitoring noise within a video signal.

BACKGROUND OF THE INVENTION

In television signal processing, various signal processing techniques are preferably changed in accordance with changes in the signal-to-noise conditions. For example, peaking of the higher frequency portions of the luminance signal should be lowered or discontinued for a noisy signal. As a further example, it is desirable to reduce color saturation for a noisy signal, thereby to avoid the kinescope being driven into over-saturation or "blooming" by noise accompanying color-difference signals.

U.S. Pat. No. 5,113,262 issued May 12, 1992 to C. H. Strolle et alii, entitled "VIDEO SIGNAL RECORDING SYSTEM ENABLING LIMITED BANDWIDTH RECORDING AND PLAYBACK" describes a modification of the VHS video cassette recording system, in which a wideband luminance signal has its spectrum folded before being used to frequency-modulate the luminance carrier during the recording of the video tape cassette, and in which the folded-spectrum signal recovered during playback by demodulating the luminance carrier is unfolded to reproduce the wideband luminance signal. During the recording of noisy composite video signals it may be desirable to limit the bandwidth of the luminance signal and avoid spectrum folding procedures. During the playback of the noisy video signals recorded without folding the spectrum of the luminance signal, the unfolding procedures can be dispensed with responsive to sensing the noise being above a prescribed level.

Generally speaking, non-coherent, random noise (such as thermal noise) accompanying a video signal can be detected by monitoring that signal during portions of the vertical blanking interval where no video information is being transmitted. Such a concept is well described in the television literature. In a video cassette recorder, however, monitoring a video signal during vertical blanking intervals in order to measure accompanying noise tends to be impractical, because the nature of video cassette recorder signal processing frequently causes additional noise and distortion during the vertical interval. Alternatively, one may consider monitoring a portion of the television horizontal scanning line. Although monitoring of the noise superposed on horizontal synchronizing pulses is a possibility, synchronization compression is likely to occur in television and video cassette recorders, and as a result monitoring of the peak portions of the horizontal synchronizing pulses is not especially reliable for noise detection.

In U.S. Pat. No. 4,873,574 issued Oct. 10, 1989 and entitled "NOISE MEASUREMENT FOR VIDEO SIGNALS", T. A. Darby describes the monitoring of a video signal during backporch intervals as respectively follow horizontal synchronizing pulses, in order to measure the noise accompanying video signals over a field interval. One noise sample is taken during each backporch interval, and the samples are accumulated over a field interval to provide a measure of the noise content accompanying the field of video information.

However, in a variety of video signal processing environments, noise can vary within the duration of one field of video, giving rise to a need for noise to be detected and measured more frequently than once a field. One noise sample taken during each backporch interval does not provide a noise-signature component that can be relied on to be representative of the noise accompanying a video signal for each horizontal line, since the single sample may be taken during a time noise energy is atypical.

SUMMARY OF THE INVENTION

It is therefore, an object of the invention disclosed herein to detect and measure the noise accompanying a video signal, and to be able to do so more frequently than once a field. An object of certain embodiments of the invention is to obtain for each horizontal line a noise-signature more closely descriptive of the average noise energy accompanying the video signal. Embodiments of the invention are suitable for use in signal processing networks of both television receivers and video cassette recorders.

The objects of the invention are achieved with processes and circuits which perform a weighted summation of the corresponding pixels of adjoining horizontal scan lines within the same field and, responsive to a burst gate signal, transmit a plurality of weighted summation results during each scan line to an integrating circuit, such as an accumulator. The burst gate signal occurs during each horizontal scan line in the video signal, in a portion of the video signal occurring just after the horizontal synchronizing pulse that is known as the "backporch" interval. In a video signal encoding color information, a chrominance burst will be provided during each backporch interval. By using appropriate weighted summation procedures, the chrominance burst components of video signal can be made to cancel, leaving as the foot-prints of the noise a plurality of noise samples having somewhat reduced energy. Integrating the absolute values of the plurality of noise samples over the period of a single horizontal scan line or of a small group of such lines provides a resultant noise-signature for that single horizontal scan line or for that small group of such lines. The detected noise condition can be appropriately filtered, and held for providing accurate indications of the average signal-to-noise condition for video signal occurring during a single scan line or during a relatively small group of scan lines.

BRIEF DESCRIPTION OF THE DRAWINGS

A more complete appreciation of the inventions, and many of the attendant advantages thereof, will be readily enjoyed as the same becomes better understood by reference to the following detailed description when considered in conjunction with the accompanying drawings in which like numbers indicate the same or similar components, wherein.

DETAILED DESCRIPTION OF THE INVENTION

Figure 1:
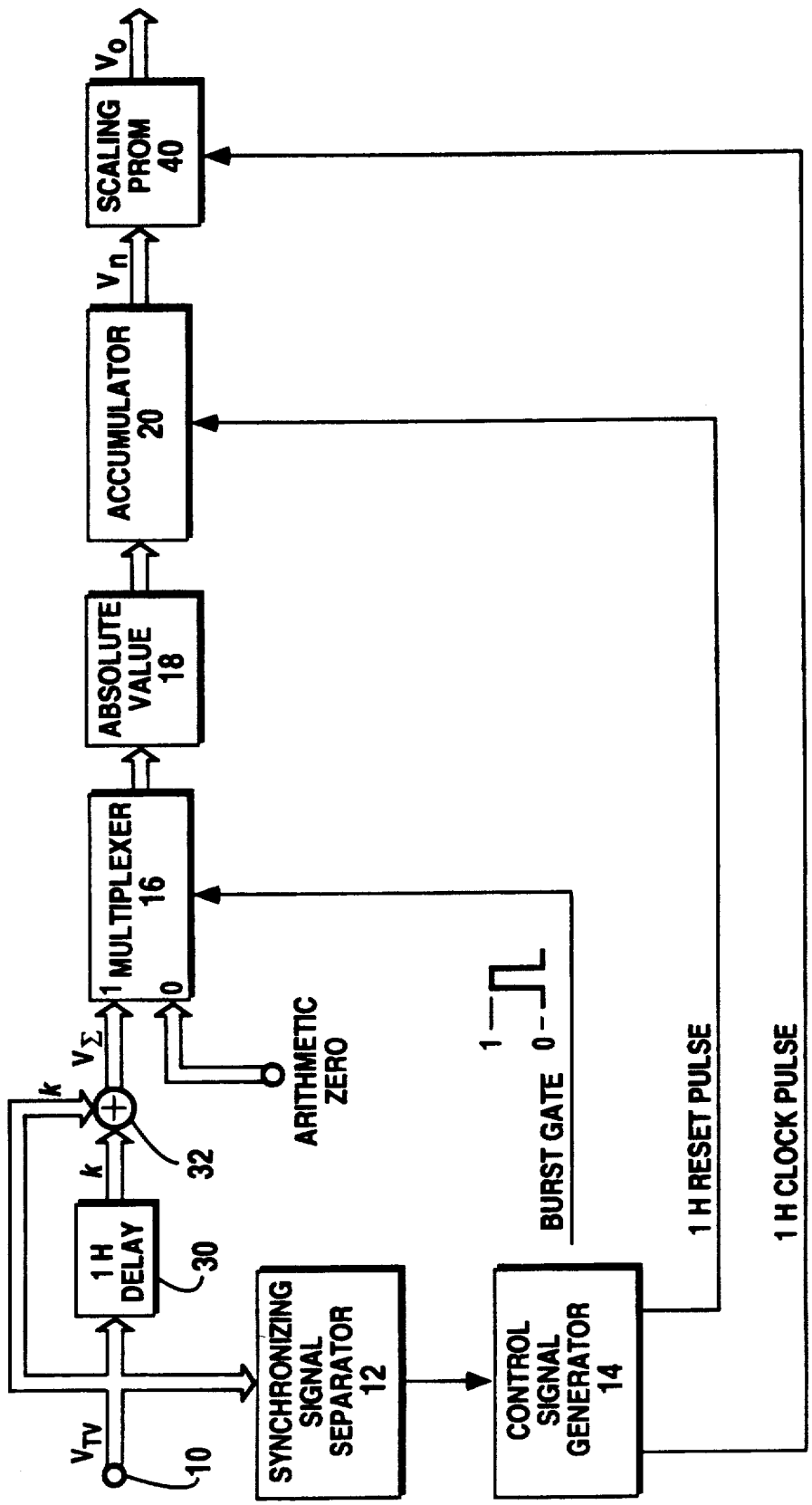
FIG. 1 is a block diagram schematic of one embodiment constructed according to the principles of the currently disclosed inventions.

Referring now to the drawings, and more particularly, to FIG. 1, a composite video signal $V_{TV}$ is applied to an input terminal 10. It is assumed that the composite video signal $V_{TV}$ is supplied as a digital signal. A synchronization signal separator 12 derives the synchronization signals from the composite video signal $V_{TV}$ and applies derived synchronization signals to time the operation of a control signal generator 14. Responsive to these synchronization signals, the control signal generator 14 provides a chrominance burst gate signal to a multiplexer 16 at a rate of once every horizontal line, a reset pulse at the rate of once every horizontal line to an accumulator 20, and a clock pulse at the rate of once every horizontal line to a scaling PROM 40.

A delay line 30 and an arithmetic processor 32 form a lowpass line comb filter that separates the baseband luminance signal component of the composite video signal $V_{TV}$ for application as an intermediate signal $V_\Sigma$ to the multiplexer 16. The chrominance signal and the color bursts following horizontal synchronizing pulses that also are components of the composite video signal $V_{TV}$ are suppressed in the signal the arithmetic processor 32 supplies to the multiplexer 16. The multiplexer 16 is operated for selecting as input signal for an absolute-value circuit 18 those portions of the separated luminance signal as occur in backporch intervals following horizontal synchronizing pulses. The absolute-value circuit 18 rectifies the multiplexer 16 output signal to generate an output signal providing unipolar indication of the energy in the separated luminance signal during intervals following horizontal synchronizing pulses. This unipolar indication is integrated respective to time by accumulating samples of the unipolar indication in the accumulator 20. The result of the accumulation is periodically sampled and held. By way of example, the sampling and holding is done by the address register of a scaling PROM 40 that provides a desired transfer function for the accumulator 20 accumulation results.

During times other than the backporch intervals following horizontal synchronizing pulses, the multiplexer 16 is conditioned to select arithmetic zero as its output signal. (In two's complement arithmetic, arithmetic zero has a ONE sign bit and other bits all ZEROs.) Arithmetic zero is made to correspond to the average value of the luminance signal during the backporch interval. This can be done, for example, by averaging the value of the multiplexer 16 output signal during the backporch interval for setting the value of arithmetic zero used for multiplexer 16 input signal and for the reference from which accumulation proceeds in the accumulator 20.

However, when the composite video signal $V_{TV}$ is digitized, dc-restoration and automatic gain control of that signal prior to digitization is of concern anyway, since it is desirable to utilize to best advantage the bit resolution available from the analog-to-digital converter. In a television receiver dc-restoration and automatic gain control are usually carried out in the analog regime, so that intermediate-frequency amplification and video detection are carried out to utilize the dynamic range of those operations effectively. However, subsequent refinement of the dc-restoration and automatic gain control of the composite video signal $V_{TV}$ just prior to digitization is usually desirable. U.S. Pat. No. 4,970,594 issued Nov. 13, 1990 to H. Kitaura et al. and entitled TELEVISION VIDEO SIGNAL CONTROL SYSTEM, which is incorporated herein by reference, describes a method for digitizing MUSE system television signals that provides for their dc-restoration and automatic gain control, in which errors in dc level and in luminance gain are detected in the digital regime after the television signal is digitized and are converted to analog form for feeding back to adjust the television signal to be digitized. Similar methods can be used for adjusting the dc level and gain of a composite video signal of a type prescribed by a conventional broadcast television standard. The departure of the average backporch level of the digitized composite video signal $V_{TV}$ from arithmetic zero is determined to generate a digital error signal that is converted to analog form to adjust the dc level of the composite video signal before its digitization. The departure of synchronizing pulse tips from a prescribed value the digitized composite video signal $V_{TV}$ is determined to generate a digital error signal that is converted to analog form to adjust the gain of the composite video signal before its digitization. These methods adjust the digitized composite video signal $V_{TV}$ so the average value of the luminance signal during the backporch interval equals arithmetic zero.

Figure 4A:
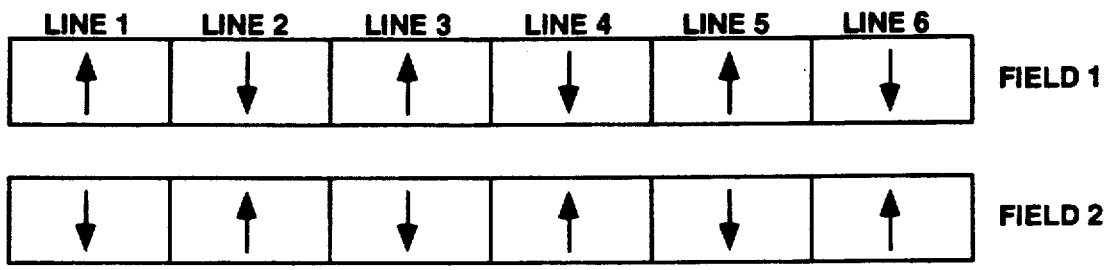
FIG. 4A is a diagrammatic representation of the phase relation between successive lines and fields of a chrominance subcarrier.

The color burst in a television signal is a series of eight to eleven cycles of a 3.58 mega-Hertz color subcarrier used to synchronize the color circuits in a television receiver with the color information of the transmitted signal. The color burst is transmitted after the horizontal synchronization signal, but before the beginning of the active video signal, during an interval of time that is referred to as the backporch interval. Referring to FIG. 4A, the choice of the frequency for the color subcarrier is such that the phase of the color subcarrier burst changes by 180° from one horizontal line to the next horizontal line. Therefore, when two consecutive horizontal lines within the same field are added, the color subcarrier components of the burst period will be 180° out of phase for the two lines added and will therefore cancel. Any non-zero sum resulting from the addition of the two horizontal lines within the region of the horizontal line where the chrominance burst is normally located (i.e., as is explained below, the "output" of the multiplexer 16), may be assumed to be due to the presence of noise.

The composite video signal $V_{TV}$ applied to the input terminal 10 is delayed by the delay line 30 for a time, 1H, which is the duration of one horizontal line scan. Corresponding pixels of the delayed horizontal line signal from 1H delay line 30 and the next horizontal line applied to the terminal 10 are added by an arithmetic processor 32 such as a multi-bit adder (e.g., a commercially available chip such as a 74F181). In one embodiment, each horizontal line may contain 910 pixels, and each pixel may be represented by an eight bit value to provide 256 variations. Consequently, when two corresponding eight-bit pixels from different horizontal lines are summed in k:k ratio by the arithmetic processor 32, the resulting sum may have nine bits. If only the eight more significant bits of the sum are supplied to the multiplexer 16, the sum is in effect divided by two after the addition. Each pixel in the sum of corresponding pixels in the composite video signals for two consecutive horizontal lines, as supplied from the arithmetic processor 32 to the multiplexer 16, may be divided by two without suffering any loss in accuracy by shifting each of its bits downward one bit place in significance. Alternatively, arithmetic processor 32 may halve the amplitude of each pixel of the delayed horizontal line and the amplitude of each pixel of the next consecutive horizontal line, by shifting each of the bits of each of these signals downward one bit place in significance, and then add corresponding halved pixel values for those two horizontal lines to provide the intermediate output signal $V_\Sigma$ to the multiplexer 16.

That is, the arithmetic processor 32 has the capability of carrying out a procedure known as "weighted summation" to generate the intermediate signal $V_\Sigma$. A weighted summation procedure can (as well known by digital electronics designers) be carried out by straightforward shifting and adding when the weights are integral powers of two, such as ½ and ¼.

Since a 40 IRE burst level is well within the video digitizing range of about 160 IRE ($-45$ to $+115$ IRE) it is advisable not to suppress the least significant bit of the intermediate signal $V_\Sigma$. Being gated by the burst gate, the multiplexer 16 supplies an output signal nominally ranging $\pm 20$ IRE and ranging up to $\pm 40$ IRE under extremely noisy conditions. This presents substantially no danger of extension beyond the normal range of the digital arithmetic. Also, suppressing the least significant bit of the intermediate signal $V_\Sigma$ lowers the threshold below which the noise goes undetected because of the digital arithmetic rounding down low levels of noise to zero. Thus, $V_\Sigma$ may be either left as a nine-bit result or its least significant bit may be suppressed to provide an eight-bit result to the absolute-value circuit 18, depending upon whether very low level noise detection is necessary. The portion of the intermediate signal $V_\Sigma$ applied by the multiplexer 16 to the absolute-value circuit 18 in response to the burst gate is thereby limited to that portion of the horizontal line occurring during one chrominance burst duration. In effect, due to the weighted sum of each line, noise present in the portion of the video signal for the first horizontal line occurring during one chrominance burst duration is digitally averaged (over two lines) by arithmetic processor 32 with the noise present in the video signal for the next successive horizontal line, whereby exact registration maintained between corresponding pixels in each pair of adjoining lines. Because of the 180° phase shift between consecutive horizontal lines, the chrominance burst signal components of each video signal in the added lines will be canceled; any non-zero output from the multiplexer 16 can be assumed to represent noise.

Consequently the accumulator 20 provides as an output, a signal $V_n$ representative of the average amplitude of the noise components of each pixel within the burst regions (or backporch intervals) of composite video signals for two horizontal lines, albeit with reduced amplitude if downshift is employed; otherwise without any loss of amplitude other than normal cancellation expected due to random nature of the noise. The next pulse applied by the generator 14 once every line to the accumulator 20 enables the accumulator 20 to be cleared after every line. This makes it possible to monitor line by line a resultant noise-signature for that line as averaged with the previous line.

Figure 3:
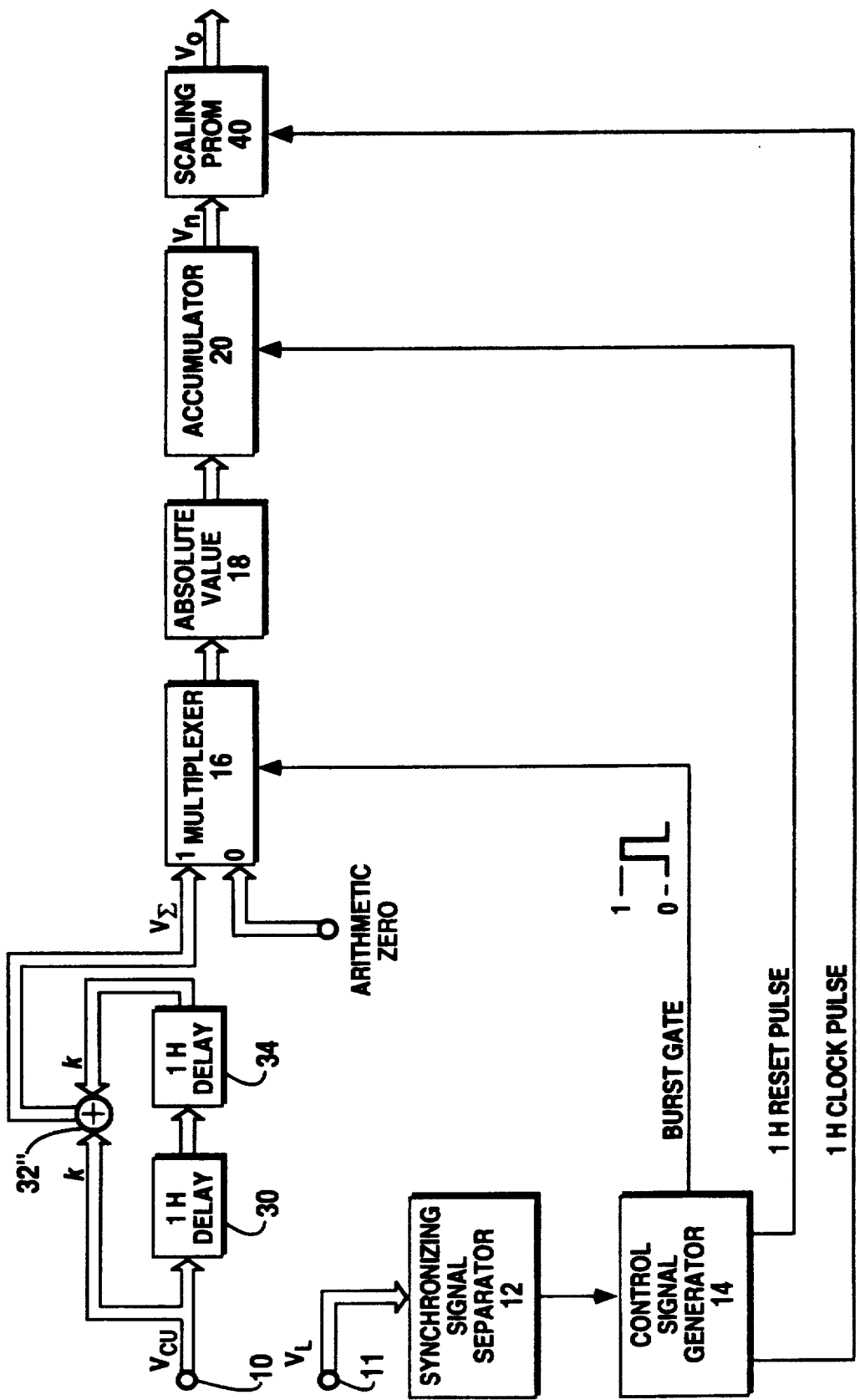
FIG. 3 is a block diagram schematic of a second alternative embodiment constructed according to the principles of the currently disclosed inventions.

The detected burst period noise signal component $V_n$ may be then applied to address a scaling circuit such as scaling programmable read only memory 40 and be subsequently amplified and filtered, and then applied, or held, for providing accurate indications $V_O$ of the signal-to-noise condition for the entire video scan line or for a relatively small group of scan lines. (This may be especially important in video cassette recorders when some tracking errors are experienced and the obtained noise value is valid only for a few lines. FIG. 3, which will be described further on in this specification shows, how the invention can be embodied in a video cassette recorder.) Additional signal processing by way of appropriate thresholds, and filtering, including "spreading" may be desired for particular applications, in order to optimize the desired performance of the monitoring circuit.

Figure 2:
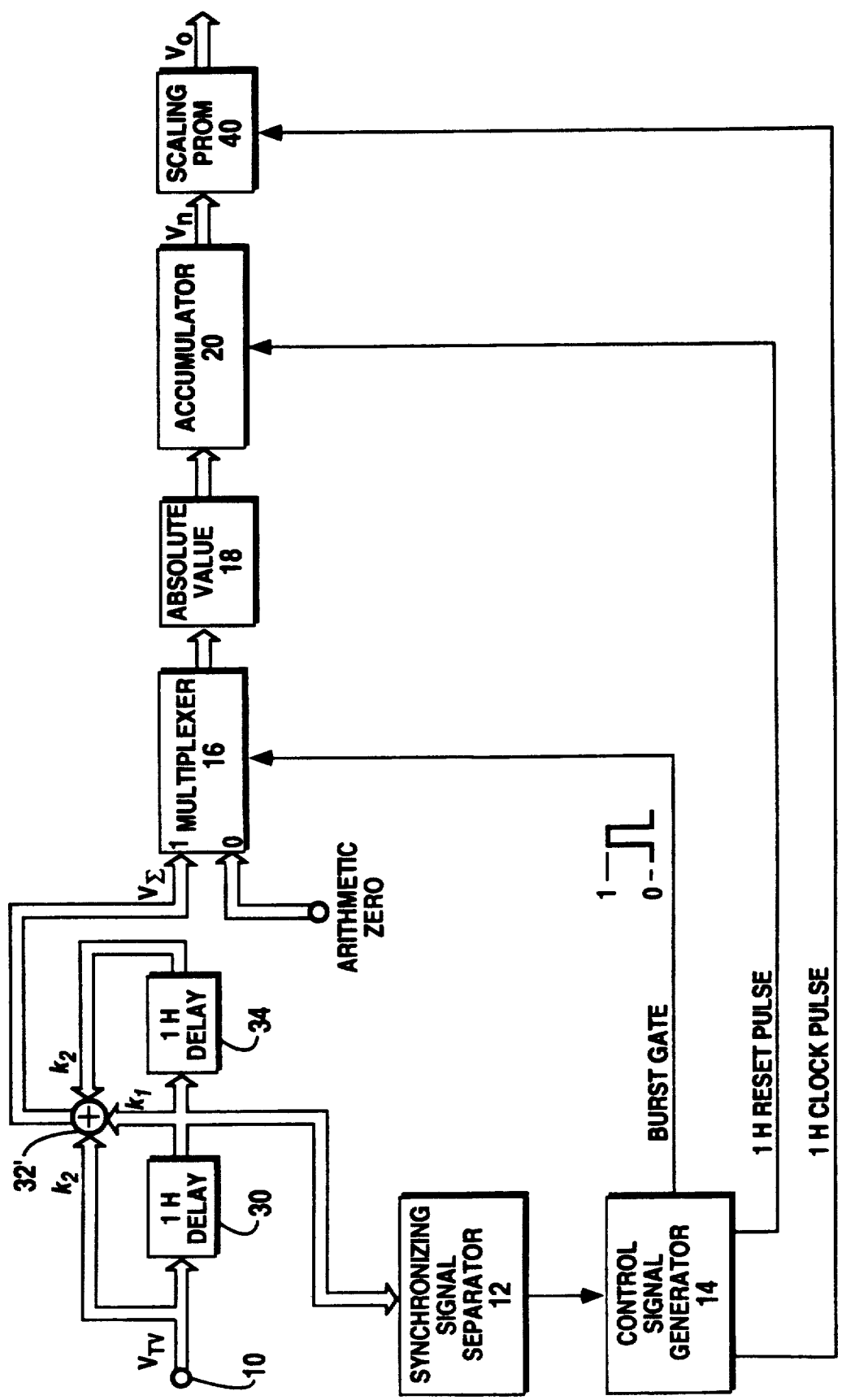
FIG. 2 is a block diagram schematic of an alternative embodiment constructed according to the principles of the currently disclosed inventions.

FIG. 2 illustrates a noise estimation circuit in which the digital composite video signal $V_{TV}$ is applied to the input terminal 10. As with the circuit illustrated in FIG. 1, the synchronization signal separator 12 derives the synchroization signals from composite video signal $V_{TV}$ and applies derived synchronization signals to the control signal generator14, which, in turn, provides a chrominance burst gate to the multiplexer 16, and a reset pulse of the beginning of the color burst period at any rate of once every horizontal line to the accumulator 20.

The FIG. 2 noise estimation circuit differs from that of FIG. 1 in that two 1H delay lines 30, 34 and an arithmetic processor 32' form are used in the lowpass line comb filter that separates the baseband luminance signal component of the composite video signal $V_{TV}$ for application to the multiplexer 16. The horizontal delay lines 30, 34 delay a digital composite video signal $V_{TV}$ applied to the terminal 10 by one horizontal scan line and by an additional horizontal scan line, respectively. The composite video signal $V_{TV}$ received at terminal 10, the composite video signal $V_{TV}$ as delayed by one horizontal scan line by delay line 30, and the composite video signal $V_{TV}$ as delayed by two horizontal scan lines by delay lines 30 and 34 are added in $k_2:k_1:k_2$ ratio by an arithmetic processor 32', in a weighted summation that generates the intermediate sum signal $V_\Sigma$ for application to the multiplexer 16.

More particularly, $k_2:k_1:k_2::k:2k:k$. Typically, $k_1=\frac{1}{2}$ and $k_2=\frac{1}{4}$, permitting the weighted summation to be carried out by the arithmetic processor 32' in a number of ways, one of which follows. The composite video signal $V_{TV}$ as received at terminal 10 and as delayed two horizontal scan lines are added together. Their sum is added to the composite video signal $V_{TV}$ as shifted one binary place towards greater significance (to multiply it by 2) and this sum is shifted two binary places towards lesser significance (to divide it by 4), thereby to generate the intermediate sum signal $V_\Sigma$.

Owing to the phase relation between chrominance subcarrier frequency for consecutive lines and weights applied in the weighted summation process, the chrominance component is exactly cancelled in the intermediate sum signal $V_\Sigma$ supplied to the multiplexer 16. The intermediate sum signal $V_\Sigma$ is a separated luminance signal the burst regions or backporch intervals of which are selected, or gated, to the absolute-value stage 18 by the multiplexer 16 responsive to the burst gate pulse. Consequently, the signal applied to the accumulator 20, is confined to an average of noise within the chrominance burst periods of three horizontal lines. The reset pulse applied by the generator 14 once every line to the acumulator 20 enables the accumulator 20 to be cleared after every horizontal line.

Within arithmetic processor 32', the pixels of the video signal for the first horizontal line are digitally added to the corresponding pixels of the video signals for the next two successive horizontal lines, with exact registration maintained between corresponding pixels in each pair of adjoining lines. Due to the 180° phase shift between adjoining horizontal lines and the digital division as, for example, of the video signal for the first line by one-quarter, of the second consecutive line by one-half, and of the video signal for the second consecutive line by one quarter, the horizontal video signal components of each pixel for all three lines will be canceled, leaving only the average amplitude of the noise components within each pixel over the burst periods of the three lines; consequently, the arithmetic processor 32' provides as an output for each line, the signal $V_\Sigma$ representative of the noise components within the chrominance burst period of the video signals averaged over each three consecutive lines. Here again, the appropriate bits can be selected at the output of the arithmetic processor 32', so as to retain the accuracy of the accumulated noise, keeping in mind that the burst is canceled at the end and that the intermediate result burst amplitude is limited as explained earlier. The burst region portions of the signal $V_\Sigma$, as selected by the multiplexer 16 are rectified by the absolute-value stage 18 and received by the accumulator 20. This value is held by the scaling PROM 40 for one complete line.

Referring now to FIG. 3, it should be noted that averaging may not be necessary for suppressing burst when directly measuring the noise in the luminance channel of a video cassette player or recorder with playback capability, because the chrominance and burst components are usually removed from the luminance signal before recording on tape. If one wishes to determine the noisiness of tape reproduction, the luminance channel generally is a poor place to make the noise measurement, however, since the luminance signal is recorded as a frequency-modulated carrier. The reproduction of the luminance signal involves limiting and frequency detection procedures that suppress noise. There is no corresponding noise suppression in the color-under channel, which conveys color-under signal in amplitude-modulation sidebands of a suppressed-carrier. When adjustments are to be made to the luminance channel depending upon the noise therein, it is generally preferably to measure noise in the color-under or chrominance channel and to infer from that measurement what the noise is in the luminance channel.

Figure 4B:
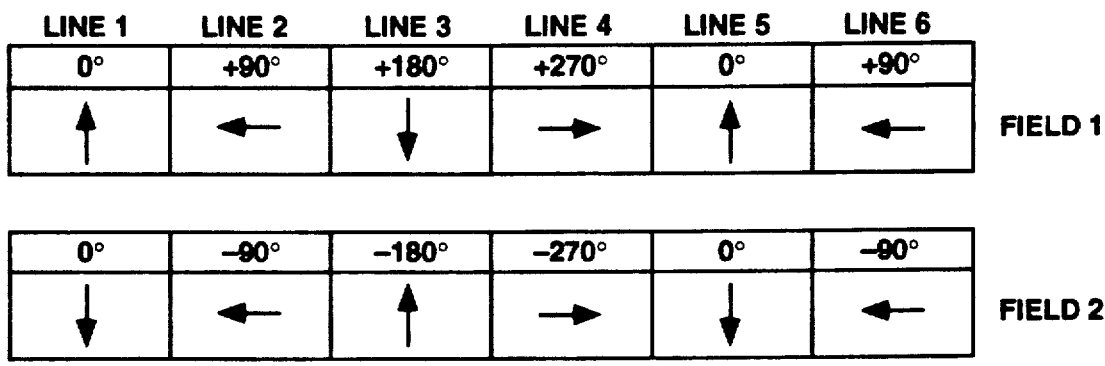
FIG. 4B is a diagrammatic representation of the phase relation between successive lines and fields of a chrominance subcarrier on two consecutive tracks after down conversion to 629 kilo-Hertz.

Averaging for suppressing burst is necessary for measurement of the noise in the 629 kilo-Hertz color-under channel. In a VHS recorder, the 3.58 mega-Hertz chrominance subcarrier frequency is down converted to 629 kilo-Hertz. In addition to this frequency shift, the phase of the chrominance subcarrier is shifted by 90° from line to line, as is shown in FIG. 4B. Furthermore, the phase shift changes direction from one field to the next. In one field, the phase is increased by 90° from line to line, while in the next field the phase is decreased by 90° from line to line. The resulting phases are shown in FIG. 4B, with arrows representing the phases at certain points within different lines. During playback, the 629 kilo-Hertz color signal is upconverted to 3.58 mega-Hertz. If noise is desired to be measured after up-conversion, the circuits of FIGS. 1 and 2 may be used; it may be desirable however to measure the noise before up-conversion and the circuit of FIG. 3 is available for this purpose.

Referring again to FIG. 3, the circuit shown determines noise from samples that are exactly two lines apart. For the detection and reduction of noise in a video cassette recorder, the chrominance signal and particular averaging is necessary to cancel the phases of the burst (90° from line-to-line with a four line repetition). Since the phase of the chrominance signal component is advanced by 90° for line-to-line, the burst component of the line next to the adjacent lines will be 180° out of phase. Moreover, the direction of phase shift changes from field to field, as is indicated in FIG. 4B. Thus, if alternate line averaging is performed, for example, the chrominance subcarrier component will be canceled but the noise, being of random nature, retains its basic characteristics even with alternate line averaging. That is, when the chrominance burst components of the first and third lines are added together, the differences in phase between the first and third lines, and between the second and fourth lines, are supplementary, thus leaving only the foot-prints of the noise-signature; consequently the accumulator 20 provides as an output for each horizontal line, a signal $V_n$ representative of the foot-prints of the noise-signature of the noise components of the input video signal $V_{VCR}$. In accordance with conventional VHS playback practice the signal played back from the video cassette recording is filtered to separate the lower-frequency color-under signal $V_{CU}$ at 629 kilo-Hertz from the frequency-modulated luma carrier, and the frequency modulation of the luma carrier is detected to recover the luminance signal $V_L$ having synchronizing signals interspersed therewithin.

Accordingly, in the embodiment of FIG. 3, a time-base corrected color-under signal $V_{CU}$ and a time-base corrected luminance signal $V_L$ are applied to input terminals 10 and 11. The synchronization separator 12 separates the synchronization signals from the luminance signal $V_L$, and supplies the separated synchronization signals to the control signal generator 14 for timing its operation. The control signal generator 14 responds to these synchronization signals to supply a chrominance burst gate pulse to the multiplexer 16 at the rate of once per scan line, to supply a reset pulse to the accumulator 20 at the beginning of the burst period at the rate of once per scan line, and to supply a clock pulse to the scaling PROM 40 at the end of the burst period. The response of the arithmetic processor 32" applied to the multiplexer 16 is gated by the burst gate pulse, and multiplexer 16 selectively transmits to the absolute value state 18 the noise samples occurring during the duration of that burst gate pulse—which is to say, that portion of the horizontal line occurring during one chrominance burst duration.

At any time within a field scan, the arithmetic processor 32" is supplied signals in first and third horizontal lines with exact registration between corresponding pixels in the two lines. The third horizontal line, taken from the terminal 10, is the currently scanned horizontal line; and the first horizontal scan line, taken from the output of the horizontal delay line 34, is from two scan lines previous. The arithmetic processor 32" performs a weighted summation of the values of the pixels in the first horizontal scan line and the values of the corresponding pixels in the third horizontal line, summing them in k:k ratio. The arithmetic processor 32" may simply consist of a digital adder, for example. Owing to the phase of the chrominance burst signal as appears in down-converted form in the color-under signal shifting 180°, as between the current horizontal scan line and that two lines back, the downconverted chrominance burst signal components of pixels summed by the arithmetic processor 32" will be canceled, leaving only the noise component averaged over alternate lines to be provided by the multiplexer 16 to the absolute-value stage 18.

Consequently, the accumulator 20 provides as an output, a signal $V_n$ representative of the footprints of the noise-signature of the noise components of the video signal obtained from each pair of alternate horizontal lines. This makes it possible to monitor the resultant noise-signature for every line, rather than simply a short or long term average which may give zero or very low output due to the nature of noise. The detected noise signal component $V_n$ may be applied to the scaling PROM 20, and then applied, or held, for providing an output $V_O$ that is an accurate indication of the signal-to-noise condition for the entire video scan line or for a relatively small group of scan lines.

As may be discerned from the foregoing detailed description, FIG. 1 discloses a circuit that receives, as an input, a video, color or composite signal in which the phase of the burst, or color carrier, is 180° out of phase from line to line, while FIG. 3 describes a circuit in which the color burst signal is 90° out of phase from line to line with either forward or backward rotation for the duration of one complete field.

Figure 5:
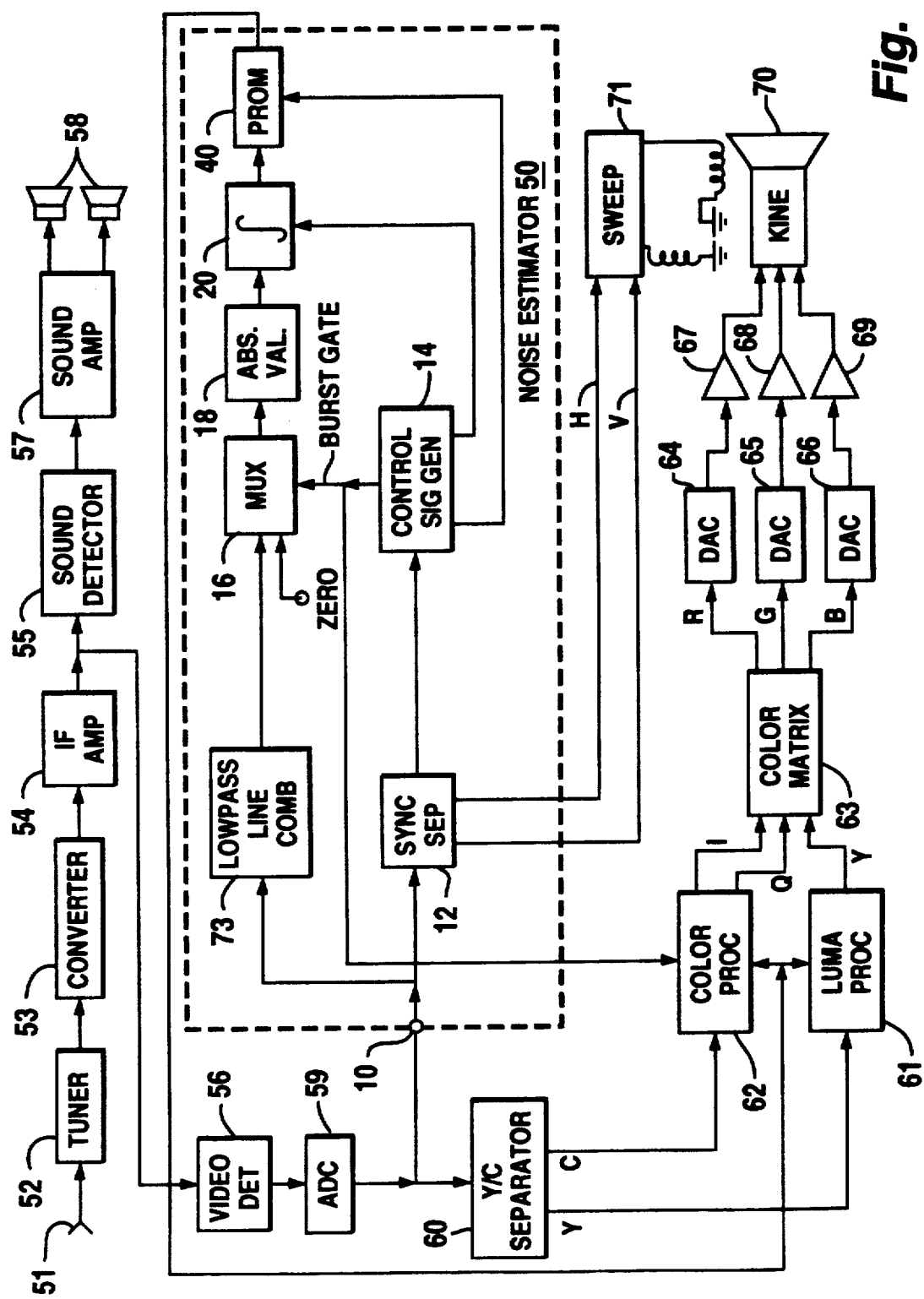
FIG. 5 is a block diagram showing the connection of the apparatus of FIG. 1 or the apparatus of FIG. 2 within a television receiver for modifying the operation thereof depending on the noise level of the received signal.

FIG. 5 shows how noise estimation apparatus 50, per FIG. 1 or FIG. 2, can be connected in a television receiver for modifying its operation in accordance with the noise level of the received television signal. This received television signal, which is a frequency-multiplexed signal comprising an amplitude-modulated radio-frequency picture carrier and a frequency-modulated radio-frequency sound carrier, is supplied to an input port 51 of a tuner section 52 of the FIG. 5 television receiver. A converter 53 converts the r-f signals to intermediate-frequency signals for amplification by an i-f amplifier section 54. The amplified i-f signals are supplied to a sound detector 55 and to a video detector 56. Sound signal detected by the sound detector 55 is supplied to a sound amplifier section 57, which may include stereophonic sound detection circuitry and which supplies amplified audio signals to one or more loudspeakers 58. The video detector 56 supplies composite video signal in analog form to an analog-to-digital converter 59 for digitization. and the resulting digitized composite video signal is supplied to the terminal 10 of the noise estimation apparatus 50.

FIG. 5 shows the digitized composite video signal from the analog-to-digital converter 59 being supplied to Y/C separation circuitry 60 for separating luminance signal Y from chrominance signal C. The luminance signal Y is supplied to luma processing circuitry 61, which includes a luma delay line, brightness control circuitry, and contrast control circuitry. The chrominance signal C is applied to chroma processing circuitry 62, which includes color saturation control circuitry, color burst separation circuitry, a local color oscillator locked in frequency and phase to separated color burst, and color-difference signal demodulators. The control signal generator 14 in the noise estimation apparatus 50 supplies the BURST GATE signal to the color burst separation circuitry in the chroma processing circuitry 62 to be used for separating the color burst signal used for locking the local color oscillator frequency and phase. Color matrix circuitry 63 generates red (R), green (G) and blue (B) signals in digital form responsive to a delayed and processed luminance signal Y from the luma processing circuitry 61 and to color-difference signals I and Q (or, alternatively, R-Y and B-Y) from the chroma processing circuitry 62. These digital R, G and B signals are converted to analog form by digital-to-analog converters 64, 65 and 66, respectively. The resulting analog red green and blue signals are amplified in the amplifiers 67, 68 and 69, respectively, to generate color drive signals for a kinescope 70. Separated horizontal and vertical synchronizing pulses from the sync separator 12 in the noise estimation apparatus 50 time the generation of horizontal and vertical sweep signals generated by sweep circuitry 71 for application to respective horizontal and vertical deflection coils 72 for the kinescope 70.

The noise estimation apparatus 50 of FIG. 5 includes a lowpass line comb filter 73. The line comb filter 73 can comprise the 1H delay line 30 and the arithmetic processor 32 in connections shown in FIG. 1. Alternatively, the line comb filter 73 can comprise the 1H delay lines 30, 34 and the arithmetic processor 32 in connections shown in FIG. 1.

FIG. 5 shows the signal $V_O$ supplied from the noise estimation apparatus 50 being supplied to the luma processing circuitry 61 which uses bits thereof for modifying the operation of circuitry 61 responsive to noise conditions. By way of example, the luma processing circuit 61 includes a digital filter providing a response to the input luminance signal, which response exhibits peaking of higher frequencies during low-noise reception conditions and exhibits no peaking or even roll-off of higher frequencies during noisy reception conditions. The digital filter response is a weighted summation of variously delayed responses to input luminance signal, with the weights being programmable responsive to digital signals encoded in certain of the bits of the $V_O$ signal supplied from the noise estimation circuitry 50.

FIG. 5 also shows the signal $V_O$ being supplied to the chroma processing circuitry 62, so certain of its bits can be used as a control signal for modifying the operation of circuitry 62 responsive to noise conditions. By way of example, the chroma processing circuitry 62 includes a digital multiplier receptive of the separated chrominance signal $V_C$ as a multiplicand signal and bits of the signal $V_O$ as a multiplier signal. The PROM 40 is programmed for providing a reduced-amplitude $V_O$ signal under noisy conditions. This reduces the level of chroma signal supplied as product from the digital multiplier to the color-difference signal demodulators, avoiding the problem of the kinescope being driven into over-saturation or "blooming" by color-difference signal noise. By way of further example, the chroma processing circuitry 62 may include digital filtering for selectively reducing chroma bandwidth in the horizontal and vertical directions during noisy reception.

Although the Y/C separation circuitry 60 is shown in FIG. 5 as being separate from circuitry 50, elements of the circuitry 50 may form a portion of the Y/C separation circuitry 60. In the FIG. 1 circuitry the 1H delay 30 cooperates with the arithmetic processor 32 that additively combines the differentially delayed composite video signal from its input and output to generate an intermediate signal $V_\Sigma$ that is a separated luminance signal Y, also referred to as "combed" luminance signal. The 1H delay 30 and another arithmetic processor that subtractively combines the differentially delayed composite video signal from its input and output will generate a separated chrominance signal C, also referred to as "combed" chrominance signal. In the FIG. 2 circuitry the 1H delays 30 and 34 cooperate with the arithmetic processor 32' to generate a $V_\Sigma$ that is a separated luminance signal Y. A separated chrominance signal C can be generated using the 1H delays 30 and 34 together with another arithmetic processor that performs a weighted summation in k:(−2k):k ratio of the signals respectively supplied from the terminal 10, from the output of the delay line 30 and from the output of the delay line 34.

Figure 6:
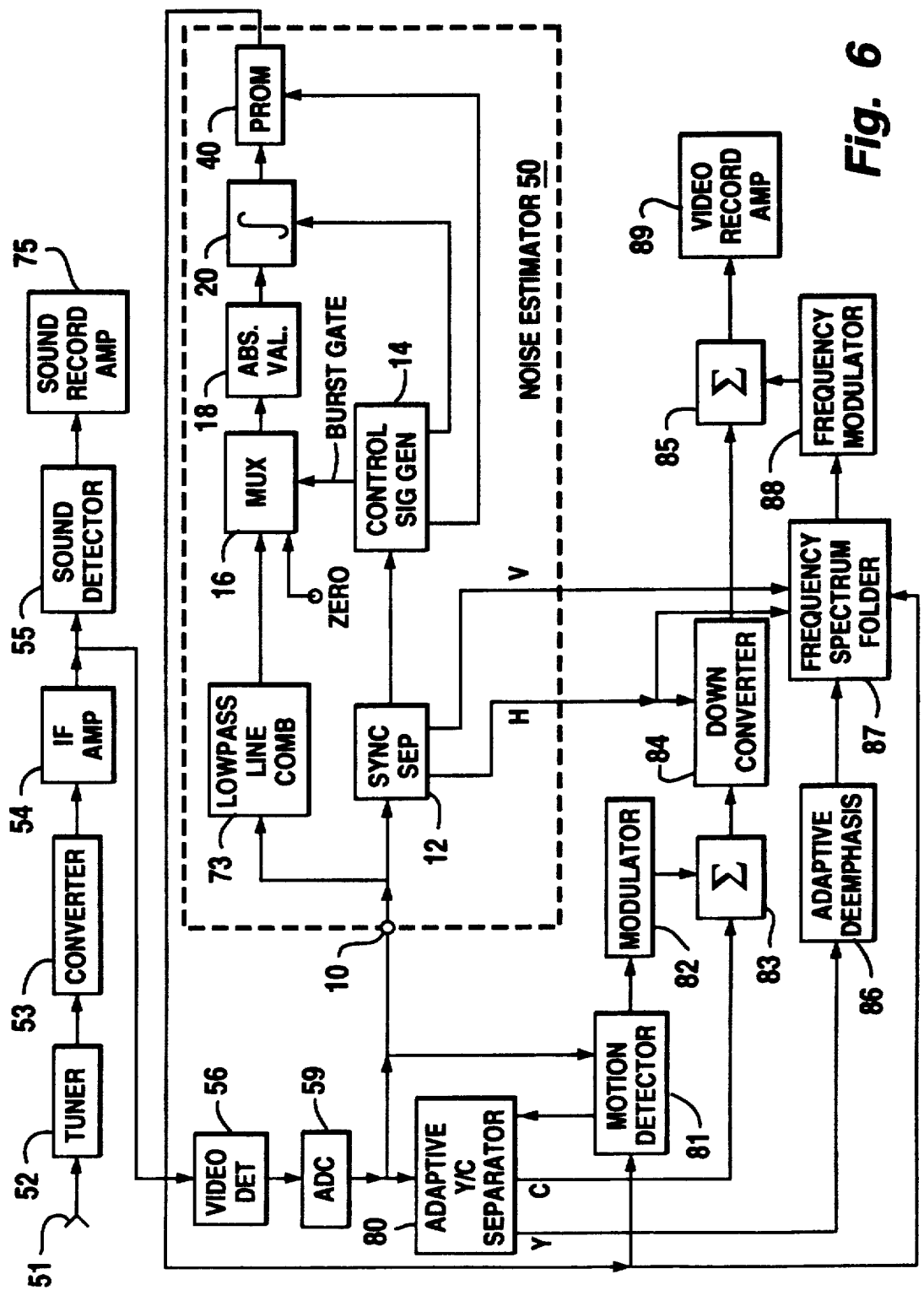
FIG. 6 is a block diagram showing the connection of the apparatus of FIG. 1 ior the apparatus of FIG. 2 within a video cassette recorder for modifying the operation thereof depending on the noise level of the received signal.

FIG. 6 shows how noise estimation apparatus 50, per FIG. 1 or FIG. 2, can be connected in a video cassette recorder (VCR) of the type described in U.S. Pat. No. 5,113,262. In this type of VCR the frequency spectrum of the luminance signal is folded in order to reduce its bandwidth for recording. The noise estimation apparatus 50 is used for modifying VCR recording operation in accordance with the noise level of a television signal received for recording at an input port 51 of a tuner section 52 of the FIG. 6 video tape recorder electronics. A converter 53 converts the r-f signals to intermediate-frequency signals for amplification by an i-f amplifier section 54. The amplified i-f signals are supplied to a sound detector 55 and to a video detector 56. The detected sound signal from the sound detector 55 is supplied to a sound recording amplifier 75. The video detector 56 supplies composite video signal in analog form to an analog-to-digital converter 59 for digitization, and the resulting digitized composite video signal is supplied to the noise estimation apparatus 50.

The digitized composite video signal is also supplied to adaptive Y/C separation circuitry 80 and a motion detector 81 associated therewith, for separating luminance signal Y from chrominance signal C. The motion detector 81 detects frame-to-frame changes in pixels and lowpass filters the detector results in the two-dimensional spatial domain, thereby to generate a motion signal M. The motion signal M is used to control the type of filtering done by the adaptive Y/C separation circuitry 80 when separating the luminance signal L and chrominance signal C components of the digitized composite video signal. The motion signal M is also supplied to a modulator 82, where it is used to modulate a suppressed carrier the phase of which varies in the same way from line to line within each field of scan. By way of example, such carrier may be an odd multiple of half scan line frequency, the phase of which is alternated from line to line. The amplitude-modulation sidebands from the modulator 82 are combined with the separated chroma sidebands C furnished by the adaptive Y/C separation circuitry 80 in an adder 83, and the resulting signal is supplied to a down converter 84 to supply a modified color-under signal to another adder 85. The luminance signal L separated by the adaptive Y/C separation circuitry 80 is supplied to an adaptive deemphasis circuit 86, which reduces the energy of higher-amplitude high-frequency luminance signal components in the signal supplied to frequency-spectrum folding circuitry 87. The spectrum folding circuitry 87 supplies a reduced-bandwidth folded-spectrum luminance signal to a frequency modulator 88, to modulate the frequency of a luma carrier. The resulting frequency-modulated luma carrier is supplied to the adder 85 to frequency multiplex with the modified color-under signal from the down converter 84. The resulting frequency-multiplexed signal is supplied to a video recording amplifier 89.

The sync separator 12 supplies separated horizontal synchronizing pulses to the downconverter 84 to be used in the automatic frequency and phase control of an oscillator involved in the generation of a 4.21 MHz carrier wave used in the down-conversion process. The sync separator 12 also supplies separated vertical synchronizing pulses to the downconverter 84 to be used in resetting a line counter therein which controls line-to-line phase changes in the 4.21 MHz carrier wave in accordance with conventional VHS recording practice. The sync separator 12 also supplies separated horizontal synchronizing pulses to the spectrum folding circuitry 87 to be used in the automatic frequency and phase control of an oscillator used to generate the carrier wave required for folding.

When scanning portions of the image where there is appreciable frame-to-frame change in successively scanned pixels, the motion signal M is appreciably large. Responsive to the motion signal M being appreciably large, the adaptive Y/C separation circuitry 80 separates the luminance signal L by lowpass line combing the composite video signal, which halves vertical spatial resolution, but avoids frame averaging. Frame averaging undesirably causes smearing of moving edges. When scanning portions of the image where there is very little or no frame-to-frame change in each successively scanned pixel, the motion signal M is very small or zero. Responsive to the motion signal M being very small or zero, the adaptive Y/C separation circuitry 80 separates the luminance signal L by lowpass frame combing the composite video signal. This best preserves vertical spatial resolution and temporally averages out noise, but causes some smearing of moving edges.

The chrominance signal C can be separated just by bandpass filtering the composite video signal to select a frequency band centered at 3.58 MHz. Alternatively, the chrominance signal C can be separated by bandpass frame combing the composite video signal or by bandpass line combing the composite video signal, depending on whether the luminance signal L is separated by lowpass frame combing or by lowpass line combing, which procedure can be followed by bandpass filtering the adaptive filter chrominance response to select a frequency band centered at 3.58 MHz.

When the composite video signal received for recording is accompanied by noise, smearing of moving edges is less evident. Also, frame-to-frame changes are increasingly attributable more to noise than to image motion. In FIG. 6 the noise estimation apparatus 50 supplies noise signature information to the motion detector 81, allowing for the level of frame-to-frame motion where frame averaging is discontinued to be set somewhat higher as composite video signals become noisier. This increases the amount of frame averaging, which reduces the apparent noise in the video information.

When the composite video signal received for recording is accompanied by substantial amounts of noise, it is better to discontinue the spectrum-folding of the luminance signal supplied to the frequency modulator 88. During playback the noise accompanying the horizontal synchronizing pulses separated from the luminance signal causes jitter in the automatic frequency and phase control signals that respond to those pulses to control the frequency and phase of an oscillator generating the carrier signal used in unfolding the luminance signal frequency spectrum. Proper performance of the spectrum unfolding procedure relies, however, upon good frequency and phase stability of the carrier signal used in unfolding. In FIG. 6 the noise estimation apparatus 50 supplies noise signature information to the luminance-signal frequency-spectrum folding circuitry 87. The folding circuitry 87 includes a threshold detector that detects this noise signature information and responds to its exceeding a prescribed threshold value to cause the higher-frequency portion of the luminance signal to be discarded, rather than being translated down in frequency to overlap the lower-frequency portion of the luminance signal.

Figure 7:
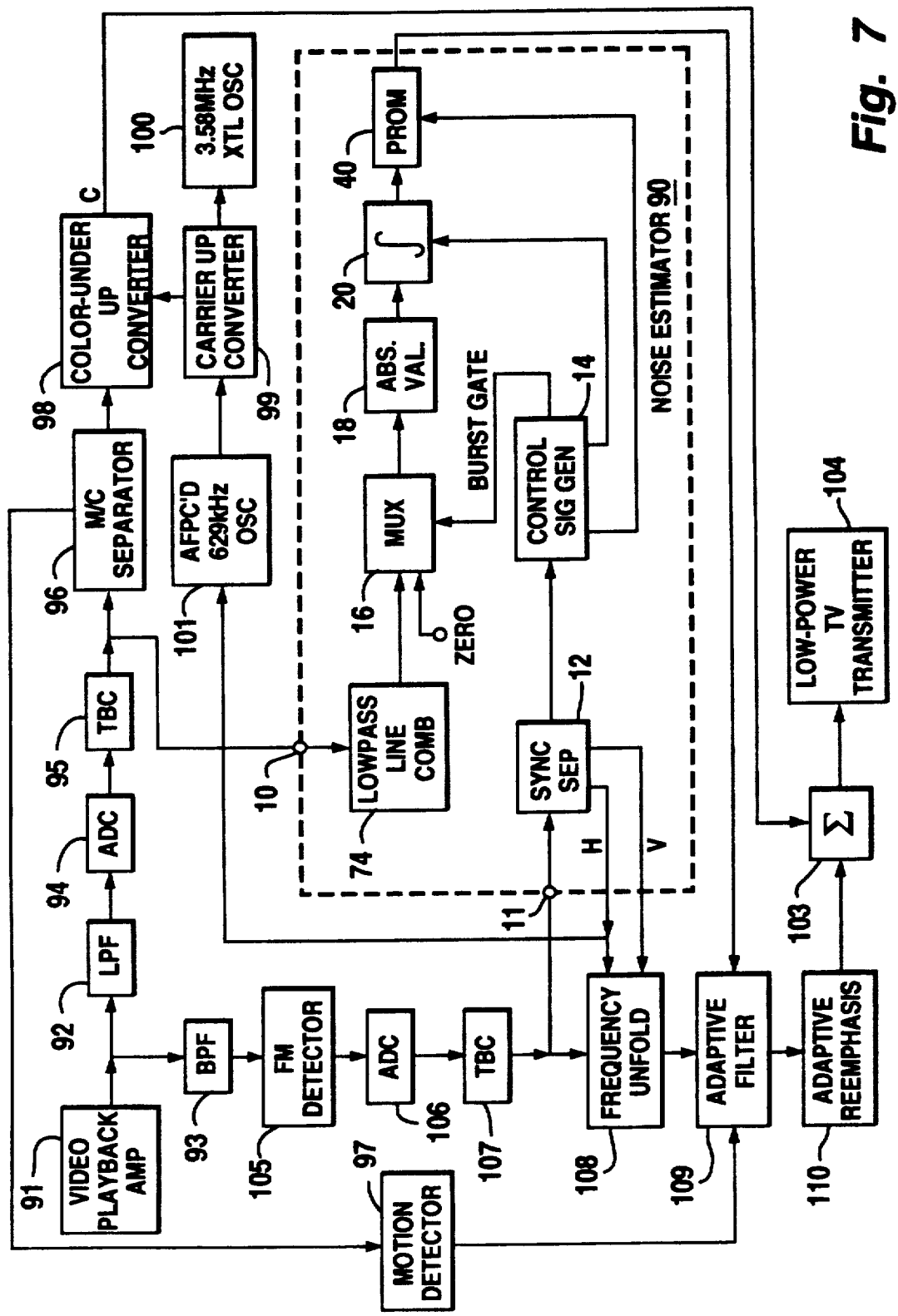
FIG. 7 is a block diagram showing the connection of the apparatus of FIG. 3 within a video cassette player for modifying the operation thereof depending on the noise level of the received signal.

FIG. 7 shows how noise estimation apparatus 90, per FIG. 3, can be connected in a video cassette recorder (VCR) or player of the type described in U.S. Pat. No. 5,113,262, for detecting the noise level of the color-under signal and modifying VCR operation when playing back recorded tape. A video playback amplifier 91 supplies to a lowpass filter 92 and to a bandpass filter 93 band the frequency multiplex signal recovered during playback of the video tape. The lowpass filter 92 separates the modified color-under signal from the frequency multiplex signal for digitization by an analog-to-digital converter 94. The digitized modified color-under signal is supplied to the terminal 10 of the noise estimation apparatus 90 and thence to lowpass line comb filter circuitry 74, of the type shown in FIG. 3, located within the apparatus 90.

The digitized modified color-under signal is also supplied to time-base correction circuitry 95, which supplies time-base-corrected digitized modified color-under signal to a motion/chroma separator 96. The separator 96 uses switched line comb filtering to separate the 629 kHz color-under amplitude-modulation sidebands and the amplitude-modulation sidebands describing the motion signal M from each other. The amplitude-modulation sidebands describing the motion signal M are supplied to a motion detector 97, which detects the motion signal M.

The 629 kHz color-under amplitude-modulation sidebands are supplied to an upconverter 98 to be upconverted to 3.58 MHz chrominance C amplitude-modulation sidebands. To implement this upconversion the upconverter 98 receives a 4.21 MHz carrier from another upconverter 99. The upconverter 99 generates the 4.21 MHz carrier by mixing 3.58 Mhz oscillations from a frequency-stable crystal oscillator 100 with 629 kHz oscillations from an oscillator 101. The sync separator 12 supplies separated horizontal synchronizing pulses to the automatic frequency and phase control circuitry of the 629 kHz oscillator 101. The sync separator 12 also supplies separated vertical synchronizing pulses to the upconverter 99 to be used in resetting a line counter therein which controls line-to-line phase changes in the 4.21 MHz carrier wave in accordance with conventional VHS playback practice. The 3.58 MHz chrominance C amplitude-modulation sidebands supplied from the upconverter 98 are summed with a recovered luminance signal in an additive combining circuit 103 to reproduce a composite video signal.

Customarily, the reproduced composite video signal is supplied to a low-power television transmitter 104, the output from which is suitable for application to a television receiver. The reproduced composite video signal is used to modulate the amplitude of a picture carrier. The frequency of sound carrier is modulated by the sound signal recovered during playback; this is not shown in FIG. 7. In a combined VCR/television receiver apparatus, or "combo", when the VCR portion of the combo is in use, the reproduced composite video signal from the VCR portion of the combo may be supplied to the television receiver portion, instead of the video detector signal.

The bandpass filter 93 selects the frequency-modulated luma carrier to an FM detector 105, which detects folded-spectrum luminance signal therefrom that is digitized by an analog-to-digital converter 106. The folded-spectrum luminance signal contains synchronizing signals and is supplied to the sync separator 12 in the noise estimator 90 via its terminal 11. FIG. 7 shows the folded-spectrum luminance signal being supplied after digitization to the sync separator 12, but alternatively the sync separator 12 could be made to respond instead to the folded-spectrum luminance signal while still in analog form. The digitized folded-spectrum luminance signal is supplied to a time-base correction circuitry 107, which supplies time-base-corrected digitized folded-spectrum luminance signal to spectrum-unfolding circuitry 108. The spectrum-unfolding circuitry 108 contains a controlled oscillator for regenerating the carrier wave originally used in the spectrum-folding procedure, which regenerated carrier wave is used in the translation of the folded spectral components back to the high-frequency band of a full-bandwidth luminance signal. The sync separator 12 in the noise estimator 90 supplies separated horizontal synchronizing pulses to the automatic frequency and phase control circuitry of the controlled oscillator for regenerating this carrier wave.

The full-bandwidth luminance signal from the spectrum-unfolding circuitry 108 contains aliases that are suppressed by an adaptive filter 109. The adaptive filter 109 lowpass frame combs the full-bandwidth luminance signal from the spectrum-unfolding circuitry 108 when the motion signal M detected by the motion detector 97 indicates little or no motion in the portion of the video image currently scanned. When the motion signal M detected by the motion detector 97 indicates appreciable motion in the portion of the video image currently scanned, the adaptive filter 109 lowpass line combs the full-bandwidth luminance signal from the spectrum-unfolding circuitry 108. The full-bandwidth luminance signal with aliases removed therefrom by the adaptive filter 109 is supplied to adaptive reemphasis circuitry 110 that boosts back to their original level, or nearly so, higher-level higher-frequency components of the luminance signal deemphasized during recording. The reemphasized luminance signal from the adaptive reemphasis circuitry 110 is summed with the chrominance C amplitude-modulation sidebands supplied from the upconverter 98 in the additive combining circuit 103.

When the level of noise in the backporch intervals of the lowpass filter 92 response becomes substantial, it may be preferable to modify the operation of the adaptive filter 109. The separated amplitude-modulation sidebands descriptive of the motion signal M are contaminated by noise, which is for the most part symmetrical in its swing about average-value axis. In video recorders or players that use synchronous detection to detect the motion signal M, this noise is strongly discriminated against in the detector response. In less-expensive video recorders or players that use an envelope detector to detect the motion signal M, this noise is rectified and augments the amplitude of the motion signal. It is desirable then to estimate the noise level and reduce the output of the envelope detector in accordance with the noise estimate, so adaptive filtering better tracks the adaptive filtering done during recording. In FIG. 7 the noise estimation apparatus 90 supplies noise signature information to the adaptive filter 109, allowing for the level of frame-to-frame motion where frame averaging is discontinued to be set somewhat higher as the color-under channel become noisier. This increases the amount of frame averaging, which reduces the apparent noise in the video information. As noted above, when the luminance signal is noisy, smearing of moving edges is less evident, so the alteration of moving edges by the increased frame-averaging is better tolerated by a viewer.

In a modification of the FIG. 7 video recorder or player apparatus, the adjustment of the adaptive filter 109 following the spectrum-unfolding circuitry 108 could be carried out proceeding from the up-converted chrominance signal C generated by the upconverter 98. In this modification the lowpass line comb filter circuitry 74, of the type shown in FIG. 3, is replaced with lowpass line comb filter circuitry 73, of the type shown in FIGS. 1 or 2.

Various other modifications and alterations may be made to the embodiments disclosed without departing from the principles of the current invention, and applications other than those disclosed here may be pursued in the practice of the principles disclosed.

What is claimed is:

1. A process for monitoring noise components of a video signal, said video signal including horizontal synchronizing pulses that recur at a horizontal line scan rate and a respective backporch interval after each horizontal synchronizing pulse in which may occur a respective burst of a subcarrier signal, said process comprising the steps of:
    receiving said video signal for a plurality of horizontal lines within a field;
    combining corresponding samples of said video signal for each currently scanned one of said horizontal lines and for at least one other of said horizontal lines of said video signal just previously scanned, to generate an intermediate signal in which bursts of said subcarrier signal are suppressed by their combining out-of-phase;
    transmitting components of said intermediate signal during each of said backporch intervals, to provide a respective succession of noise samples, as selected from among other samples of said intermediate signal; and
    generating a representation of the noise level in the horizontal lines of said video signal combined to generate each horizontal line of said intermediate signal, by accumulating the absolute values of the noise samples in said respective succession of noise samples, as selected from among other samples of said intermediate signal.

2. The process of claim 1, wherein the phase of said burst of subcarrier signal at points in each horizontal line scan of each field is opposite to the phase of said burst of subcarrier signal at corresponding points in each adjoining horizontal line scan in that field, and wherein said step of combining corresponding samples of said video signal for each currently scanned one of said horizontal lines and for at least one other of said horizontal lines of said video signal just previously scanned to generate an intermediate signal comprises the substeps of:
    delaying, by the period of one horizontal scan line, said video signal as currently scanned; and
    performing a weighted summation in k:k ratio of said corresponding pixels for said video signal as currently scanned and as delayed by the period of one horizontal scan line to generate said intermediate signal, k being the value of weighting factors in said weighted summation.

3. The process of claim 2, wherein the frequency of said subcarrier is an odd half-multiple of said horizontal scan rate.

4. The process of claim 3, wherein said video signal is a composite video signal having a luminance component at baseband and having a chrominance component comprising sidebands of said subcarrier signal.

5. The process of claim 4, wherein said subcarrier signal has a frequency of 3.58 mega-Hertz.

6. The process of claim 2, said process further comprising the additional steps of:
    addressing a scaling memory with said representation of the noise level sample after each of said backporch intervals.

7. The process of claim 6, said process further comprising the additional steps of:
    separating said horizontal synchronizing pulses from said video signal to provide a timing reference for the steps set forth hereafter in this claim;
    generating a respective burst gate pulse during each of said backporch intervals to enable said transmitting of said components of said intermediate signal during each said backporch interval;
    generating a reset signal at the beginning of each said backporch interval to start from zero the accumulating of the absolute values of the noise samples; and
    generating a clock pulse at the end of each said backporch interval to enable said addressing of said scaling memory with said representation of the noise level sample after each said backporch interval.

8. The process of claim 1, wherein the phase of said burst of subcarrier signal at points in each horizontal line scan of each field is opposite to the phase of said burst of subcarrier signal at corresponding points in each adjoining horizontal line scan in that field, and wherein said step of combining corresponding samples of said video signal for each currently scanned one of said horizontal lines and for at least one other of said horizontal lines of said video signal just previously scanned to generate an intermediate signal comprises the substeps of:

delaying, by periods of one horizontal scan line and of two horizontal scan lines, said video signal as currently scanned; and performing a weighted summation in $k_2:k_1:k_2$ ratio of said corresponding pixels for said video signal as currently scanned, as delayed by the period of one horizontal scan line and as delayed by the period of two horizontal scan lines, thereby to generate said intermediate signal, $k_1$ and $k_2$ being the values of weighting factors used in said weighted summation, with $k_1$ being twice $k_2$.

9. The process of claim 8, wherein the frequency of said subcarrier is an odd half-multiple of said horizontal scan rate.

10. The process of claim 9, wherein said video signal is a composite video signal having a luminance component at baseband and having a chrominance component comprising sidebands of said subcarrier signal.

11. The process of claim 10, wherein said subcarrier signal has a frequency of 3.58 mega-Hertz.

12. The process of claim 8, said process further comprising the additional steps of:

addressing a scaling memory with said representation of the noise level sample after each of said backporch intervals.

13. The process of claim 12, said process further comprising the additional steps of:

separating said horizontal synchronizing pulses from said video signal to provide a timing reference for the steps set forth hereafter in this claim;

generating a respective burst gate pulse during each of said backporch intervals to enable said transmitting of said components of said intermediate signal during each said backporch interval;

generating a reset signal at the beginning of each said backporch interval to start from zero the accumulating of the absolute values of the noise samples; and generating a clock pulse at the end of each said backporch interval to enable said addressing of said scaling memory with said representation of the noise level sample after each said backporch interval.

14. For use with a machine that recovers a luminance signal and an accompanying color-under signal from a recording medium, a process for monitoring noise components of said color-under signal, said luminance signal including horizontal synchronizing pulses that recur at a horizontal line scan rate, there being a backporch interval after each horizontal synchronizing pulse during which at least at times said color-under signal includes a respective burst of a subcarrier signal, wherein the phase of said burst of subcarrier signal at points in each horizontal line scan of each field changes is in quadrature with the phase of said burst of subcarrier signal at corresponding points in each adjoining horizontal line scan in that field, said process comprising the steps of:

delaying, by the period of two horizontal scan lines, said color-under signal as currently scanned; and performing a weighted summation in k:k ratio of corresponding pixels for said said color-under signal as currently scanned as currently scanned and as delayed by the period of two horizontal scan lines to generate an intermediate signal in which said bursts of subcarrier signal are suppressed by their combining out-of-phase;

transmitting components of said intermediate signal during each of said backporch intervals, to provide a respective succession of noise samples, as selected from among other samples of said intermediate signal; and generating a representation of the noise level in the horizontal lines of color-under signal combined to generate each horizontal line of said intermediate signal, by accumulating the absolute values of the noise samples in said respective succession of noise samples, as selected from among other samples of said intermediate signal.

15. The process of claim 14, wherein said subcarrier signal has a frequency of 629 kilo-Hertz.

16. The process of claim 14, said process further comprising the additional steps of:

addressing a scaling memory with said representation of the noise level sample after each of said backporch intervals.

17. The process of claim 16, said process further comprising the additional steps of:

separating said horizontal synchronizing pulses from said luminance signal to provide a timing reference for the steps set forth hereafter in this claim;

generating a respective burst gate pulse during each of said backporch intervals to enable said transmitting of said components of said intermediate signal during each said backporch interval;

generating a reset signal at the beginning of each said backporch interval to start from zero the accumulating of the absolute values of the noise samples; and generating a clock pulse at the end of each said backporch interval to enable said addressing of said scaling memory with said representation of the noise level sample after each said backporch interval.

18. A circuit for monitoring noise components of a video signal, comprising:

receiving means for receiving at least a first video signal for successive horizontal lines within the same field, said first video signal including horizontal synchronizing pulses that recur at a horizontal line scan rate, each said video signal having a respective backporch interval after each horizontal synchronizing pulse in said first video signal, one of said video signals having a respective burst of a subcarrier signal in each backporch interval thereof;

means for generating an intermediate signal in which said bursts of subcarrier signal are suppressed, by additively combining pixels of a currently received horizontal line of said one of said video signals with corresponding pixels of at least one previously received horizontal line of said one of said video signals within the same field;

means for selectively transmitting components of said intermediate signal during each backporch interval, to provide a respective plurality of noise samples;

means responding to said noise samples for generating respective indications of their absolute values; and means for accumulating said respective indications of the absolute values of said plurality of noise samples during each backporch interval, thereby to generate a respective accumulation result.

19. The circuit of claim 18, further comprised of:

means for applying without appreciable delay, to a first input port of said generating means, said video signal having a respective burst of a subcarrier signal in each backporch interval thereof, as received by said receiving means; and means coupled between said receiving means and a second input port of said generating means, for delaying by the period of one horizontal line said video signal in which respective bursts of a subcarrier signal occur during backporch intervals.

20. The circuit of claim 19, further comprising:

memory means addressable by said respective accumulation results for providing output signals indicative of said noise components.

21. The circuit of claim 19, wherein said means for generating an intermediate signal includes:

means for performing a weighted summation in k:k ratio of each pair of pixels concurrently received at the first and second input ports of said means for generating an intermediate signal, thereby generating a corresponding sample of said intermediate signal.

22. The circuit of claim 19, wherein said first video signal is said video signal in which respective bursts of a subcarrier signal occur during backporch intervals.

23. The circuit of claim 18, further comprised of:

means for applying without appreciable delay, to a first input port of said generating means, said video signal having a respective burst of a subcarrier signal in each backporch interval thereof, as received by said receiving means;

means coupled between said receiving means and a second input port of said generating means, for delaying by the period of one horizontal line said video signal in which respective bursts of a subcarrier signal occur during backporch intervals; and means coupled between said receiving means and a third input port of said generating means, for delaying by the period of two horizontal lines said video signal in which respective bursts of a subcarrier signal occur during backporch intervals.

24. The circuit of claim 23, further comprising:

memory means addressable by said respective accumulation results for providing output signals indicative of said noise components.

25. The circuit of claim 23, wherein said means for delaying by the period of two horizontal lines said video signal in which a respective bursts of a subcarrier signal occur during backporch intervals comprises:

a first one-horizontal-scan-time delay line, having an input port to which said receiving means directly connects and having an output port; and a second one-horizontal-scan-time delay line, having an input port to which the output port of said first one-horizontal-scan-time delay lines directly connects and having an output port directly connected to the third input port of said generating means.

26. The circuit of claim 25, wherein the output port of said first one-horizontal-scan-time delay line directly connects to the first input port of said generating means, said first one-horizontal-scan-time delay line thereby providing said means coupled between said receiving means and a first input port of said generating means for delaying said video signal in which a respective bursts of a subcarrier signal occur during backporch intervals by the period of one horizontal line.

27. The circuit of claim 23, wherein said means for generating an intermediate signal includes:

means for performing a weighted summation in $k_2:k_1:k_2$ ratio of each set of three pixels concurrently received at the first, second and third input ports of said means for generating an intermediate signal, thereby generating a corresponding sample of said intermediate signal.

28. The circuit of claim 23, wherein said first video signal is said video signal in which respective bursts of a subcarrier signal occur during backporch intervals.

29. The circuit of claim 18, wherein said one of said video signals having a respective burst of subcarrier signal in each backporch interval thereof is a second video signal received by said means for receiving at least a first video signal.

30. The circuit of claim 29; arranged for receiving said first and second video signals, which said second video signal is of the type wherein within each field of horizontal scan lines the respective burst of subcarrier signal in the backporch interval of each successive horizontal scan line of said second video signal differs from the respective burst of subcarrier signal in the backporch interval of the preceding horizontal scan line of said second video signal by 90° in a sense prescribed for that field; and further comprised of:

means for applying without appreciable delay, to a first input port of said generating means, said second video signal as received by said receiving means; and means coupled between said receiving means and a second input port of said generating means, for delaying by the period of two horizontal lines said second video signal.

31. The circuit of claim 30, wherein said means for generating an intermediate signal includes:

means for performing a weighted summation in k:k ratio of each pair of pixels concurrently received at the first and second input ports of said means for generating an intermediate signal, thereby generating a corresponding sample of said intermediate signal.

32. The circuit of claim 31, further comprising:

memory means addressable by said respective accumulation results for providing output signals indicative of said noise components.

33. For inclusion in a television receiver including:

a video detector for supplying a composite video signal;

a synchronizing signal separator for separating horizontal and vertical synchronizing pulses from said composite video signal;

a burst gate generator responding to separated horizontal synchronizing pulses for generating a burst gate signal during burst gate intervals which occur soon after each horizontal synchronizing pulse and which each extend over a time corresponding to the time that the pedestal or back-porch period follows a horizontal synchronizing pulse in the composite video signal and includes the color burst, if any;

a noise estimator responding to selected portions of said composite video signal for supplying a noise estimation signal having a magnitude directly related to the noisiness of a currently received television signal; and apparatus for altering the performance of the television receiver responsive to the noise estimation signal, the improvement wherein said noise estimator comprises:

means for additively combining the burst gate intervals of a succession of horizontal scan lines having various-phase chroma burst components to generate a result-of-combination signal in which the various-phase chroma burst components of the combined components combine to substantially zero value while accompanying noise adds vectorially to non-zero value;

means for supplying as its output signal a succession of unipolar indications of the energy in its input signal, connected to receive said result-of-combination signal as its input signal; and means for integrating the unipolar indications of the energy in said result-of-combination signal over each burst gate interval to provide a noise estimation sample.

34. The improvement of claim 33 wherein said noise estimator further includes:

a memory for storing each successive noise estimation sample for a prescribed time interval, an integral number of horizontal scan lines long, for sustained application to said apparatus for altering the performance of the television receiver responsive to the noise estimation signal.

35. The improvement of claim 33 wherein said means for combining the burst gate intervals of a succession of horizontal scan lines having various-phase chroma burst components to generate a result-of-combination signal comprises:

a tapped delay line having taps at intervals separated by integral numbers of horizontal scan line durations, said tapped delay line having an input tap to which is applied at least those portions of said composite video signal occurring during said burst gate intervals; and combining circuitry for linearly combining signals from the taps of said tapped delay line so as to generate said result-of-combination signal in which the various-phase chroma burst components of the combined signals combine so as to cancel substantially to zero.

36. The improvement of claim 35 wherein said composite video signal is continually applied to the input tap of said tapped delay line; and, responsive to said burst gate pulse being supplied thereto as a control signal thereof, a multiplexer applies as input signal to said absolute-value circuitry only those portions of the result-of-combination signal as occur during said burst gate interval.

37. The improvement of claim 35 wherein said tapped delay line includes an input tap, an output tap and a 1H delay line therebetween; and said combining circuitry comprises means for adding in 0.5:0.5 weighting the signals at the input and output taps of said delay line to generate said result-of-combination signal in which the various-phase chroma burst components of the combined signals combine so as to cancel substantially to zero.

38. The improvement of claim 37 wherein said composite video signal is continually applied to the input tap of said tapped delay line; and, responsive to said burst gate pulse being supplied thereto as a control signal thereof, a multiplexer applies as input signal to said absolute-value circuitry only those portions of the result-of-combination signal as occur during said burst gate interval.

39. The improvement of claim 35 wherein said tapped delay line includes an input tap, a mid tap, an output tap, a 1H delay line between its input and mid taps, and a further 1H delay line between its mid and output taps; and said combining circuitry comprises means for adding together in 0.25:0.5:0.25 weighting, as summands, the signals at the input, mid and output taps of said delay line to generate said result-of-combination signal in which the various-phase chroma burst components of the combined signals combine so as to cancel substantially to zero.

40. The improvement of claim 39 wherein said composite video signal is continually applied to the input tap of said tapped delay line; said synchronizing signal separator is connected for receiving said composite video signal from the mid tap of said delay line; and, responsive to said burst gate pulse being supplied thereto as a control signal thereof, a multiplexer applies as input signal to said absolute-value circuitry only those portions of the result-of-combination signal as occur during said burst gate interval.

41. The improvement of claim 35 wherein said tapped delay line includes an input tap, a mid tap, an output tap, a 1H delay line between its input and mid taps, and a further 1H delay line between its mid and output taps; and said combining circuitry comprising means for additively combining the signals at the input and output taps of said delay line to generate said result-of-combination signal in which the various-phase chroma burst components of the combined signals combine so as to cancel substantially to zero.

42. The improvement of claim 41 wherein said composite video signal is continually applied to the input tap of said tapped delay line; said synchronizing signal separator is connected for receiving said composite video signal from the mid tap of said delay line; and, responsive to said burst gate pulse being supplied thereto as a control signal thereof, a multiplexer applies as input signal to said absolute-value circuitry only those portions of the result-of-combination signal as occur during said burst gate interval.

43. The improvement of claim 33 wherein said means for supplying as its output signal a unipolar indication of the energy in its input signal comprises an absolute-value circuit.

44. The improvement of claim 33 wherein said video detector is of a type including circuitry for digitizing said composite signal as supplied to said noise estimation circuitry and wherein said means for integrating the unipolar indication of the energy in said result-of-combination signal over each burst gate interval to provide a noise estimation sample comprises an accumulator.

45. For inclusion in a video tape recorder including:
means for receiving a composite video signal to be recorded;

a synchronizing signal separator for separating horizontal and vertical synchronizing pulses from said composite video signal;

a burst gate generator responding to separated horizontal synchronizing pulses for generating a burst gate signal during burst gate intervals which occur soon after each horizontal synchronizing pulse and which each extend over a time corresponding to the time that the pedestal or back-porch period follows a horizontal synchronizing pulse in the composite video signal and includes the color burst, if any;

a noise estimator responding to selected portions of said composite video signal for supplying a noise estimation signal having a magnitude directly related to the noisiness of a television signal currently received for recording; and apparatus for altering the performance of the video tape recorder responsive to the noise estimation signal, the improvement wherein said noise estimator comprises:

means for additively combining the burst gate intervals of a succession of horizontal scan lines having various-phase chroma burst components to generate a result-of-combination signal in which the various-phase chroma burst components of the combined components combine substantially to zero value while accompanying noise adds vectorially to non-zero value;

means for supplying as its output signal a succession of unipolar indications of the energy in its input signal, connected to receive said result-of-combination signal as its input signal; and means for integrating the unipolar indications of the energy in said result-of-combination signal over each burst gate interval to provide a noise estimation sample.

46. The improvement of claim 45 wherein said noise estimator further includes:

a memory for storing each successive noise estimation sample for a prescribed time interval, an integral number of horizontal scan lines long, for sustained application to said apparatus for altering the performance of the television tape recorder responsive to the noise estimation signal.

47. The improvement of claim 45 wherein said means for combining the burst gate intervals of a succession of horizontal scan lines having various-phase chroma burst components to generate a result-of-combination signal comprises:

a tapped delay line having taps at intervals separated by integral numbers of horizontal scan line durations, said tapped delay line having an input tap to which is applied at least those portions of said composite video signal occurring during said burst gate intervals; and combining circuitry for linearly combining signals from the taps of said tapped delay line so as to generate said result-of-combination signal in which the various-phase chroma burst components of the combined signals combine so as to cancel substantially to zero.

48. The improvement of claim 47 wherein said tapped delay line includes an input tap, a mid tap, an output tap, a 1H delay line between its input and mid taps, and a further 1H delay line between its mid and output taps; and said combining circuitry comprising means for additively combining the signals at the input, mid and output taps of said delay line to generate said result-of-combination signal in which the various-phase chroma burst components of the combined signals combine so as to cancel substantially to zero.

49. The improvement of claim 48 wherein said means for supplying as its output signal a unipolar indication of the energy in its input signal comprises an absolute-value circuit.

50. The improvement of claim 49 wherein said composite video signal is continually applied to the input tap of said tapped delay line; said synchronizing signal separator is connected for receiving said composite video signal from the mid tap of said delay line; and, responsive to said burst gate pulse being supplied thereto as a control signal thereof, a multiplexer applies as input signal to said absolute-value circuitry only those portions of the result-of-combination signal as occur during said burst gate interval.

51. The improvement of claim 50 wherein said video detector is of a type including circuitry for digitizing said composite signal as supplied to said noise estimation circuitry and wherein said means for integrating the unipolar indication of the energy in said result-of-combination signal over each burst gate interval to provide a noise estimation sample comprises an accumulator.

52. The improvement of claim 45 wherein said video detector is of a type including circuitry for digitizing said composite signal as supplied to said noise estimation circuitry and wherein said means for integrating the unipolar indication of the energy in said result-of-combination signal over each burst gate interval to provide a noise estimation sample comprises an accumulator.

53. For inclusion in a video tape player including:

means for recovering a frequency multiplexed signal from a recorded video tape, said frequency multiplexed signal including in an upper frequency band thereof sidebands of a frequency-modulated luma carrier encoding a luminance-descriptive signal including horizontal and vertical synchronizing pulses, said frequency multiplexed signal including in a lower frequency band thereof sidebands of an amplitude-modulated suppressed color-under carrier that includes a color-burst-descriptive signal segment each time the pedestal or back-porch period follows a horizontal synchronizing pulse in said luminance-descriptive signal;

a filter for separating said lower and upper frequency bands of said frequency multiplexed signal;

an upconverter for converting the amplitude-modulated suppressed color-under carrier in the separated lower frequency band of said frequency multiplexed signal up in frequency to regenerate chrominance sidebands of a suppressed color subcarrier;

a frequency-modulation detector for recovering said luminance-descriptive signal from the separated upper frequency band of said frequency multiplexed signal;

a synchronizing signal separator for separating the horizontal and vertical synchronizing pulses from said recovered luminance-descriptive signal;

a burst gate generator responding to said separated horizontal synchronizing pulses for generating a burst gate signal during burst gate intervals which occur soon after each horizontal synchronizing pulse and which each extend over a time corresponding to the time that the pedestal or back-porch period follows a horizontal synchronizing pulse in said recovered luminance-descriptive signal;

a noise estimator responding to selected portions of the separated lower frequency band of said frequency multiplexed signal for supplying a noise estimation signal descriptive of noise in said separated lower frequency band of said frequency multiplexed signal; and apparatus for altering the performance of the video tape player responsive to the noise estimation signal, the improvement wherein said noise estimator comprises:

means for additively combining the burst gate intervals of a succession of horizontal scan lines of a signal at said upconverter, thereby to generate a result-of-combination signal in which the various-phase signals in the combined components that are descriptive of color subcarrier phasing combine substantially to zero value while accompanying noise adds vectorially to non-zero value;

means for supplying as its output signal a succession of unipolar indications of the energy in its input signal, connected to receive said result-of-combination signal as its input signal; and means for integrating the unipolar indications of the energy in said result-of-combination signal over each burst gate interval to provide a noise estimation sample.

54. The improvement of claim 53 wherein said noise estimator further includes:

a memory for storing each successive noise estimation sample for a prescribed time interval, an integral number of horizontal scan lines long, for sustained application to said apparatus for altering the performance of the television tape player responsive to the noise estimation signal.

55. The improvement of claim 53 wherein said means for combining the burst gate intervals of a succession of horizontal scan lines of a signal at said upconverter, thereby to generate a result-of-combination signal, comprises:

a delay line having an input port to which is applied at least those portions of said color-under signal providing the input signal of said upconverter occurring during said burst gate intervals and having an output port providing response two horizontal scan line durations later to the signal applied to its input port; and combining circuitry for linearly combining signals from the input and output ports of said delay line so as to generate said result-of-combination signal.

56. The improvement of claim 55 wherein said means for supplying as its output signal a unipolar indication of the energy in its input signal comprises an absolute-value circuit.

57. The improvement of claim 56 wherein said color-under signal providing the input signal of said upconverter is continually applied to the input port of said delay line and, responsive to said burst gate pulse being supplied thereto as a control signal thereof, a multiplexer applies as input signal to said absolute-value circuitry only those portions of the result-of-combination signal as occur during said burst gate interval.

58. The improvement of claim 57; wherein said video detector is of a type including circuitry for digitizing said color-under signal providing the input signal of said upconverter, as supplied to said noise estimation circuitry; and wherein said means for integrating the unipolar indication of the energy in said result-of-combination signal over each burst gate interval to provide a noise estimation sample comprises an accumulator.

59. The improvement of claim 53; wherein said video detector is of a type including circuitry for digitizing said color-under signal providing the input signal of said upconverter, as supplied to said noise estimation circuitry; and wherein said means for integrating the unipolar indication of the energy in said result-of-combination signal over each burst gate interval to provide a noise estimation sample comprises an accumulator.

* * * * *